(12) United States Patent
Abdallah et al.

(10) Patent No.: US 12,352,050 B2
(45) Date of Patent: Jul. 8, 2025

(54) BUILDING SEMI-PERMANENT WEATHERPROOFING MEMBRANE WITH TRANSITIONAL PERMANENT AIR/VAPOR BARRIER CAPABILITIES AND METHODS OF USING SAME

(71) Applicant: Seaman Corporation, Wooster, OH (US)

(72) Inventors: Gisica Nasim Abdallah, Akron, OH (US); Ibrahim Alayidi, Brunswick, OH (US); Stephen Kuhel, Medina, OH (US); Chrisopher Meyer, Seven Hills, OH (US); Gary Pelton, Jr., Ashland, OH (US); Ralph Edward Raulie, Akron, OH (US); Paul Joseph Roe, Granger, IN (US); Jason M. Spruell, Wooster, OH (US); Ryan Van Wert, Medina, OH (US)

(73) Assignee: Seaman Corporation, Wooster, OH (US)

( * ) Notice: Subject to any disclaimer, the term of this patent is extended or adjusted under 35 U.S.C. 154(b) by 148 days.

(21) Appl. No.: 18/171,142

(22) Filed: Feb. 17, 2023

(65) Prior Publication Data

US 2023/0279663 A1 Sep. 7, 2023

Related U.S. Application Data

(60) Provisional application No. 63/311,901, filed on Feb. 18, 2022.

(51) Int. Cl.
*E04D 5/14* (2006.01)
*B32B 5/02* (2006.01)
*B32B 7/12* (2006.01)
*B32B 37/12* (2006.01)
(Continued)

(52) U.S. Cl.
CPC .............. *E04D 5/148* (2013.01); *B32B 5/024* (2013.01); *B32B 5/026* (2013.01); *B32B 7/12* (2013.01);
(Continued)

(58) Field of Classification Search
CPC .......... E04D 5/148; E04D 5/10; E04D 11/02; B32B 5/024; B32B 5/026; B32B 2255/02;
(Continued)

(56) References Cited

U.S. PATENT DOCUMENTS

2006/0099370 A1* 5/2006 Glass .................... B32B 27/06
428/40.1
2006/0292945 A1 12/2006 Kuhn et al.
(Continued)

FOREIGN PATENT DOCUMENTS

CN 1812158 A 8/2006
WO 2009143432 A2 11/2009
WO 2020106108 A1 5/2020

OTHER PUBLICATIONS

International Search Report from PCT/US2023/062811 dated Jun. 7, 2023 (13 pages).

*Primary Examiner* — Mark R Wendell
(74) *Attorney, Agent, or Firm* — Calfee, Halter & Griswold LLP

(57) ABSTRACT

A building membrane having a generally planar core having a top surface and a bottom surface, a polymeric back coat positioned below the bottom surface of the core; a polymeric face coat positioned above the top surface of the core; an adhesive base on at least a portion of the back coat adapted for adhering the building membrane to a building substrate.

25 Claims, 7 Drawing Sheets

(51) Int. Cl.
*E04D 5/10* (2006.01)
*E04D 11/02* (2006.01)

(52) U.S. Cl.
CPC ............ *B32B 37/1284* (2013.01); *E04D 5/10* (2013.01); *B32B 2255/02* (2013.01); *B32B 2255/26* (2013.01); *B32B 2255/28* (2013.01); *B32B 2307/414* (2013.01); *B32B 2307/54* (2013.01); *B32B 2307/581* (2013.01); *B32B 2307/5825* (2013.01); *B32B 2307/712* (2013.01); *B32B 2307/724* (2013.01); *B32B 2307/7242* (2013.01); *B32B 2307/732* (2013.01); *B32B 2419/00* (2013.01); *E04D 11/02* (2013.01)

(58) Field of Classification Search
CPC ............ B32B 2255/26; B32B 2255/28; B32B 2307/414; B32B 2307/54; B32B 2307/581; B32B 2307/5825; B32B 2307/712; B32B 2307/724; B32B 2307/7242; B32B 2307/732; E32B 37/1284

See application file for complete search history.

(56) References Cited

U.S. PATENT DOCUMENTS

| | | | |
|---|---|---|---|
| 2007/0277450 A1* | 12/2007 | Raulie | B32B 25/00 52/90.1 |
| 2009/0208714 A1* | 8/2009 | Currier | C04B 28/14 428/212 |
| 2009/0321001 A1 | 12/2009 | Dye et al. | |
| 2023/0138907 A1* | 5/2023 | Buhrman | E04D 5/141 156/71 |

* cited by examiner

BUILDING SEMI-PERMANENT WEATHERPROOFING MEMBRANE WITH TRANSITIONAL PERMANENT AIR/VAPOR BARRIER CAPABILITIES AND METHODS OF USING SAME

CROSS-REFERENCE TO RELATED APPLICATIONS

This application claims priority to and the benefit of U.S. Provisional Patent Application No. 63/311,901, filed Feb. 18, 2022, the entire content of which is incorporated herein by reference.

TECHNICAL FIELD

The present disclosure relates generally to a membrane system for roofing applications and methods for applying/affixing the membrane system to a roof deck or other roofing infrastructure. More specifically, the present disclosure relates to a fabric reinforced thermoplastic and/or thermoset membrane with enhanced durability, flame resistance, and weatherability for use both as a temporary semi-permanent roof and ultimately as a permanent vapor and air barrier as part of a final roof assembly.

BACKGROUND

Often, building membranes are designed for use on flat and low slope commercial and industrial roofs as temporary or short-term repairs/replacements for damaged roofs until permanent repairs can be made. Building membranes are also utilized as temporary roofs during new construction until final, permanent roof assemblies can be installed. For example, a building membrane might be used as a temporary roof for tear-off areas during construction. Because temporary roofs are not required to comply with standards applicable to permanent roofs, existing building membrane products designed to be a temporary solution generally exhibit significantly reduced durability and weatherability when compared to permanent roofs. They are also either removed prior to installing final roof assemblies or serve no functional purpose in the final roof assemblies. In most instances, existing building membranes are designed to be replaced within a year or less. In other cases, a building membrane designed for vapor barrier protection will be used as a temporary weather proofing cover with limited performance or product claims to substantiate that use before that layer is incorporated in the finished roof assembly in its intended use.

SUMMARY

In an exemplary embodiment, a building membrane is provided. The building membrane comprises: a generally planar core having a top surface and a bottom surface, a polymeric back coat positioned below the bottom surface of the core, a polymeric face coat positioned above the top surface of the core, a polymeric top coat positioned above the face coat, and an adhesive base on at least a portion of the back coat adapted for adhering the building membrane to a building substrate. At least in part, the building membrane of the present invention is designed to improve existing building membranes and to combat unprecedented supply chain shortages which might prevent immediate or even reasonably expeditious installation of a final roof assembly. It is thus desirable that the building membrane of the present invention be used as a semi-permanent roof and as part of a subsequently installed final roof assembly.

In another exemplary embodiment, a roofing membrane is provided. The building membrane comprises: a generally planar fabric core having a top surface and a bottom surface, an adhesive coat which planarly encompasses and at least partially penetrates the fabric core, a polymeric back coat positioned below the bottom surface of the fabric core and adhered to the fabric core by the adhesive coat, a polymeric face coat positioned above the top surface of the fabric core and adhered to the fabric core by the adhesive coat, a polymeric top coat positioned above the face coat, and a heat-activated adhesive base on at least a portion of the back coat and adapted for adhering the roofing membrane to a building substrate.

In another exemplary embodiment, a method of affixing the building membrane is provided. The method comprises: adhering a building membrane to a roofing substrate and, without removing said membrane, affixing one or more additional roofing elements to the roofing substrate on top of the roofing membrane to form a final roof assembly.

These and other objects, features, and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Figure 1:
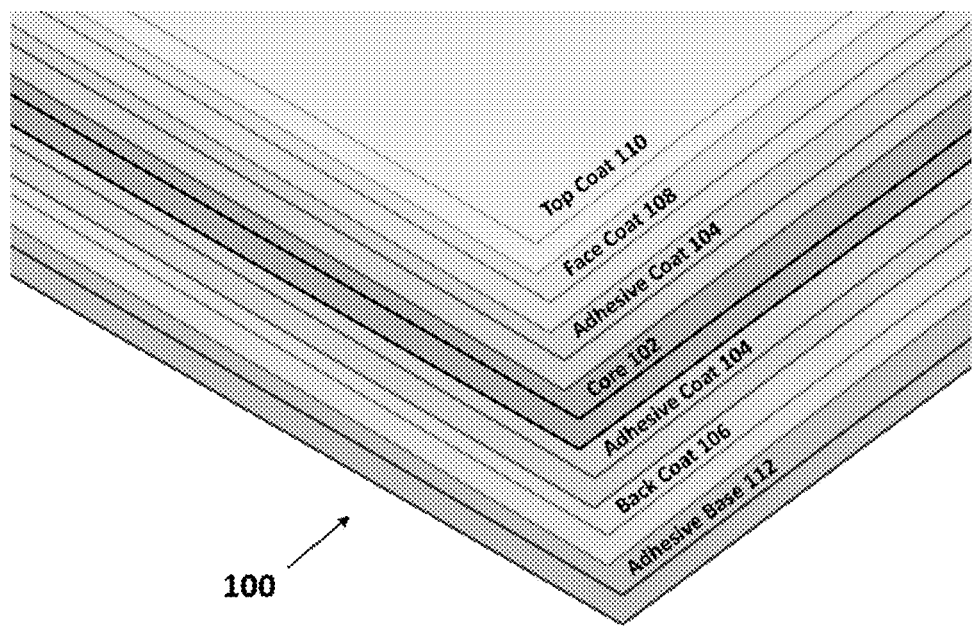
FIG. 1 is a perspective cut away view of a building membrane according to the concepts of the present disclosure.

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

As used herein, the term "building membrane" can refer to any structure designed to provide temporary/non-permanent/semi-permanent-) cover over an area from the effects of weather, dust, etc. For example, a temporary roof can comprise ANSI/ASSP A10.18-2007 (R2012) compliant corrugated metal roofing sheets or shrink wrap film. For instance, plastic/polyethylene films can be used as a building membrane and joined/connected/contacted or otherwise affixed or attached to a building to provide a roof-like cover. Polyethylene can be loose laid, glued, ballasted or fastened to provide a roof-like cover that lasts for a relatively short time such as a few months. Additionally, EPDM film can be loose laid or ballasted and thermoplastic polyolefin film can likewise be mechanically fastened to form a short-term roof-like covering. Also, SBS coated film with a pressure sensitive adhesive can be used to form a short-term roof-like covering.

As used herein, the term "final roof assembly" or "permanent roof" can refer to a structure with enhanced durability and weatherability designed to provide long-term cover over an area from the effects of rain, snow, wind, hail, pooling water and other similar weather conditions while also providing cover for the building and possibly having rigidity/strength to support mechanical structures such as HVAC units and being intended to last for extended periods of time measured in years.

As used herein, the term "planarly encompass" can describe a layer or coat that covers both planar surfaces of a layer or sheet. For example, a layer or sheet consisting of hypothetical material "A," that is fully coated on both planar surfaces by hypothetic material "B," would be said to be planarly encompassed by the material "B."

As used herein, the term "welding" is typically understood to be the process whereby metal and/or plastic components/articles are joined together through some form of heat fusion, which can be processes including, but not limited to, induction, ultrasonic or hot gas welding. Also, metal and/or plastic components may be joined together using heat-activated adhesives that are activated in processes similar to the above-listed welding processes.

As used herein, the term "ultrasonic welding" can refer to an industrial process whereby high-frequency ultrasonic acoustic vibrations are locally applied to parent material(s) and/or filler being held together under pressure to create a solid-state weld.

As used herein, the term "induction welding" can refer to a method of welding whereby electromagnetic induction is used to heat, directly or indirectly, the parent material(s) and/or filler. Non-magnetic workpieces can be induction-welded by implanting them with metallic compounds or by inductively heating metallic elements in contact with the non-magnetic workpiece, thereby inductively heating the non-magnetic workpiece. As a result, the induction welding heats the metal roof deck in order to conductively activate a heat-activated adhesive and thereby join/adhere/connect the roof components to each other.

As used herein, the term "hot gas welding" can refer to a method of welding whereby hot air is used to heat, directly or indirectly, the parent material(s) and/or filler.

As used herein, the term "heat sealing" can refer to a method of sealing one thermoplastic to another similar thermoplastic using heat and pressure. For example, the direct contact method of heat sealing utilizing a constantly heated die or sealing bar to apply heat to a specific contact area or path to seal or weld the thermoplastics together.

As used herein, the term "transparent laser plastic welding" can refer to the method of welding whereby a laser is used to heat one or more transparent parent material(s) and/or filler.

Exemplary membranes and methods as described herein are directed to roofing, but it is understood that the disclosed membrane and methods are not limited to roofing. It is contemplated that the disclosed membranes and methods of using same can be utilized in many aspects of building and/or other weatherproofing applications.

With reference to FIG. 1, an exemplary building membrane 100 is shown. The illustrated embodiment comprises a core 102, an adhesive coat 104 planarly encompassing the core 102, a polymeric back coat 106, a polymeric face coat 108, an optional polymeric topcoat 110, and an adhesive base 112. These coats may be applied to the core 102 and coats using a variety of methods including as plastisol coatings, which can be PVC dispersed in plasticizer. When utilizing a plastisol coating, a curing step is typically used whereby limited evaporation occurs during curing so that the PVC particles ultimately form a substantially continuous network of PVC and plasticizer.

Likewise, solvent, fusion or lamination processes can also be utilized to join, connect or adhere the coats 104, 106, 108 and/or 110 to the core. In a solvent process, a solvent is evaporated by heating to fix the coats to the core. In a lamination process, the coats can be "stack" or layers of films that are pressed together to form the building membrane 100. Also, the components/layers of the building membrane 100 can be formed/joined via hot melt processes such as extrusion or calendaring.

The core 102 is generally planar, having a top surface and a bottom surface. The back coat 106 is positioned below the bottom surface of the core 102, the face coat is positioned above the top surface of the core 102, the top coat 110 is positioned above the face coat 108 and the adhesive base 112 is on at least a portion of the back coat 106.

In certain embodiments, the core 102 comprises a woven fabric, however it is appreciated that the core 102 can comprise a knitted or nonwoven fabric. The core 102 can be puncture, tensile and tear-resistant and may be constructed from high tenacity yarn. It is contemplated that the core need not be fabric and that any suitable generally planar reinforcing material may be used.

Figure 2:
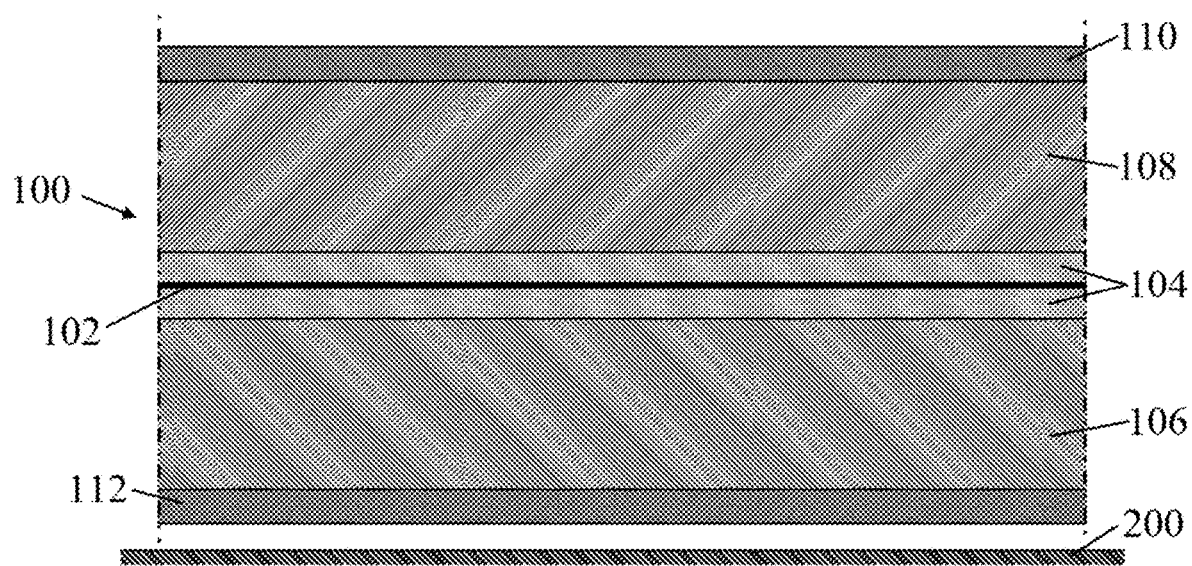
FIG. 2 is a cross-sectional view of the building membrane of FIG. 1.

FIG. 2 illustrates a cross-section of the building membrane 100 adhered to a roof deck 200. As can be seen in FIG. 2, in certain embodiments, a fabric core 102 is provided. The fabric core 102 can be a textile, woven, non-woven, knit or other similar such material. Likewise, the adhesive coat 104, which planarly encompasses the core 102, adheres the back coat 106, which can be a thermoplastic, to the bottom surface of the fabric core 102 and the face coat 108, which can also be a thermoplastic, to the top surface of fabric core 102.

In some embodiments, the adhesive coat 104 at least partially permeates the core 102. In further embodiment, the adhesive coat 104 forms a molecular bond between the core 102, the back coat 106, and the face coat 108. However, it is appreciated that the adhesive coat 104 need not permeate the core 102 or molecularly bond the core 102, the back coat 106, and the face coat 108. In other embodiments, the adhesive coat 104 may mechanically adhere the back coat 106 to the bottom surface of the fabric core 102 and the face coat 108 to the top surface of the fabric core 102. In embodiments, the adhesive coat 104 may also inhibit wicking and/or yield improved peel resistance and/or seam strength.

In certain embodiments, the building membrane 100 does not require an adhesive coat 104. The back and face coats 106 and 108 can be self-adhering. In other embodiments, the core 102 can be self-adhering. It is appreciated that the back and face coats 106 and 108 need not be adhered to the core 102 by the same means or be in direct contact with the core 102. In embodiments, the building membrane may comprise any number of additional layers or coats positioned between the back and face coats 106 and 108 and the core 102.

In certain embodiments, the back and/or face coats 106 and 108 are comprised of polyvinyl chloride. However, it is appreciated that the back and face coats 106 and 108 can be composed of any thermoplastic material suitable based on processability, flexibility and cost. Thermoplastics such as PVC, PVC and KEE or TPO are examples of such suitable materials for the coats 106 and 108, respectively. The primary function of the back coat 106 and face coat 108 is to seal the building membrane 100 (FIG. 2) and act a durable weather barrier.

In certain embodiments, the polymeric topcoat 110 comprise an acrylic, keeping in mind that the topcoat is an optional component to the building membrane 100. In further embodiments, the polymeric topcoat 110 comprises a solvent applied vinyl-acrylic with a dry thickness of 0.1-1.0 mils. It should be appreciated that the topcoat 110 can be composed from acrylics, vinyls, urethanes, polycarbonates, fluoropolymers and blends thereof. Also, the topcoat can be either thermoset or thermoplastics with the topcoat 110 included in order to provide improved or increased cleanability, stain-resistance, UV absorption and abrasion-resistance.

In certain embodiments, the adhesive base 112 can comprise a heat-activated adhesive. In further embodiments, the adhesive base 112 can comprise a heat-activated adhesive that bonds between 250- and 500-degrees Fahrenheit. It is also contemplated that the adhesive base 112 can comprise a pressure-activated adhesive or a heat- and pressure-activated adhesive. The adhesive base 112 may comprise a continuous layer of adhesive or any number of discrete adhesive elements.

Figure 3:
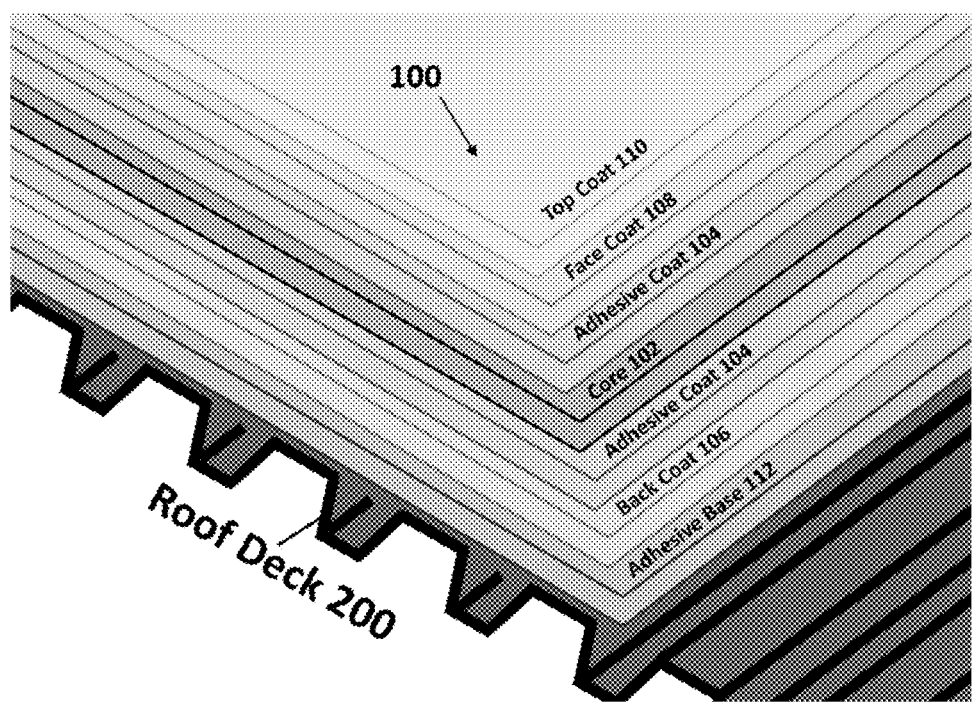
FIGS. 3-7 are perspective cutaway views of the building membrane of FIG. 1 applied to a corrugated roof deck and ultimately incorporated into a final roof assembly where the final roof assembly is attached to the roof deck/building membrane using differing connection methods to create different type of final roof systems including adhered, partially adhered, mechanically fastened and induction welded.
Figure 4:
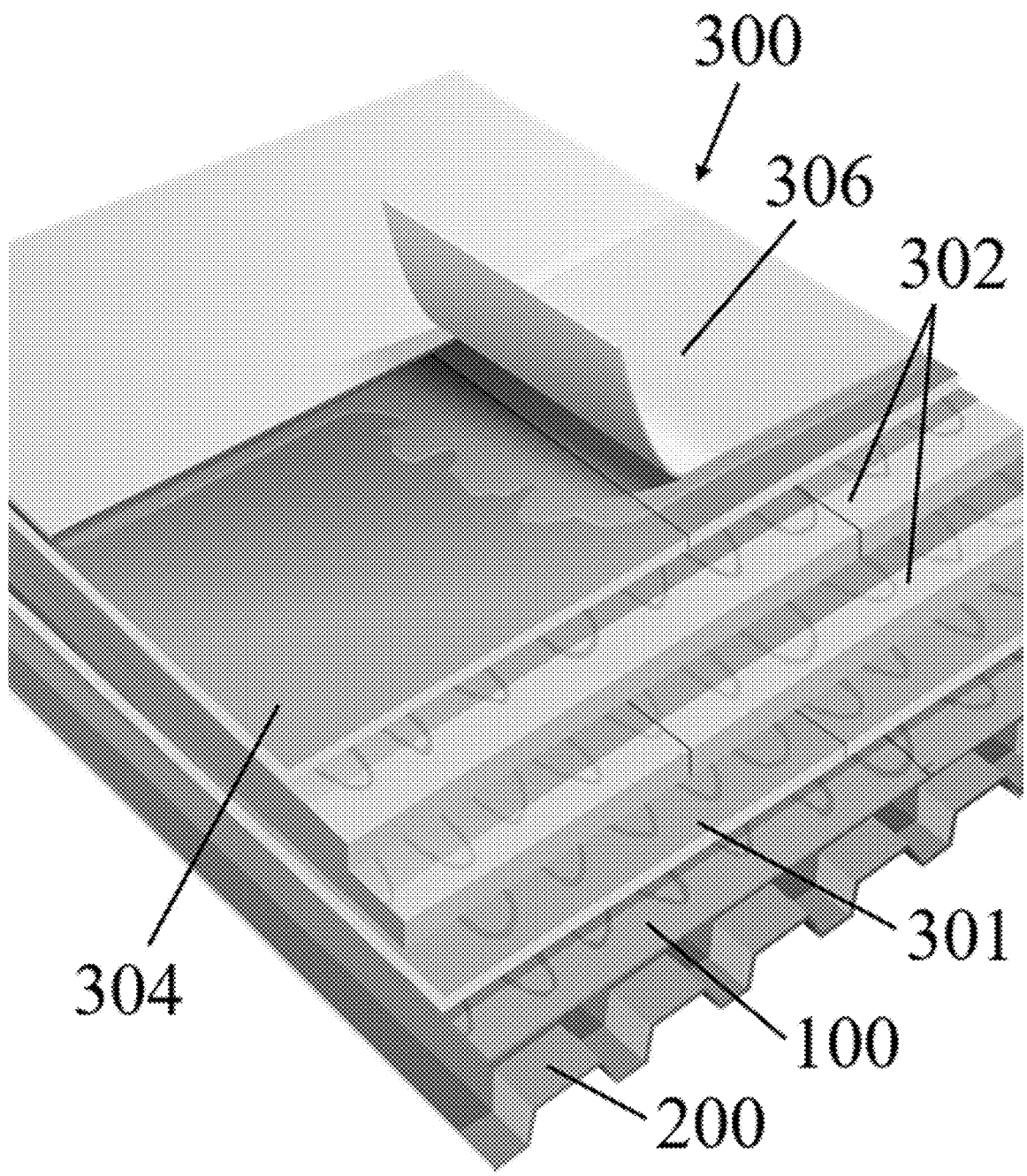
Figure 5:
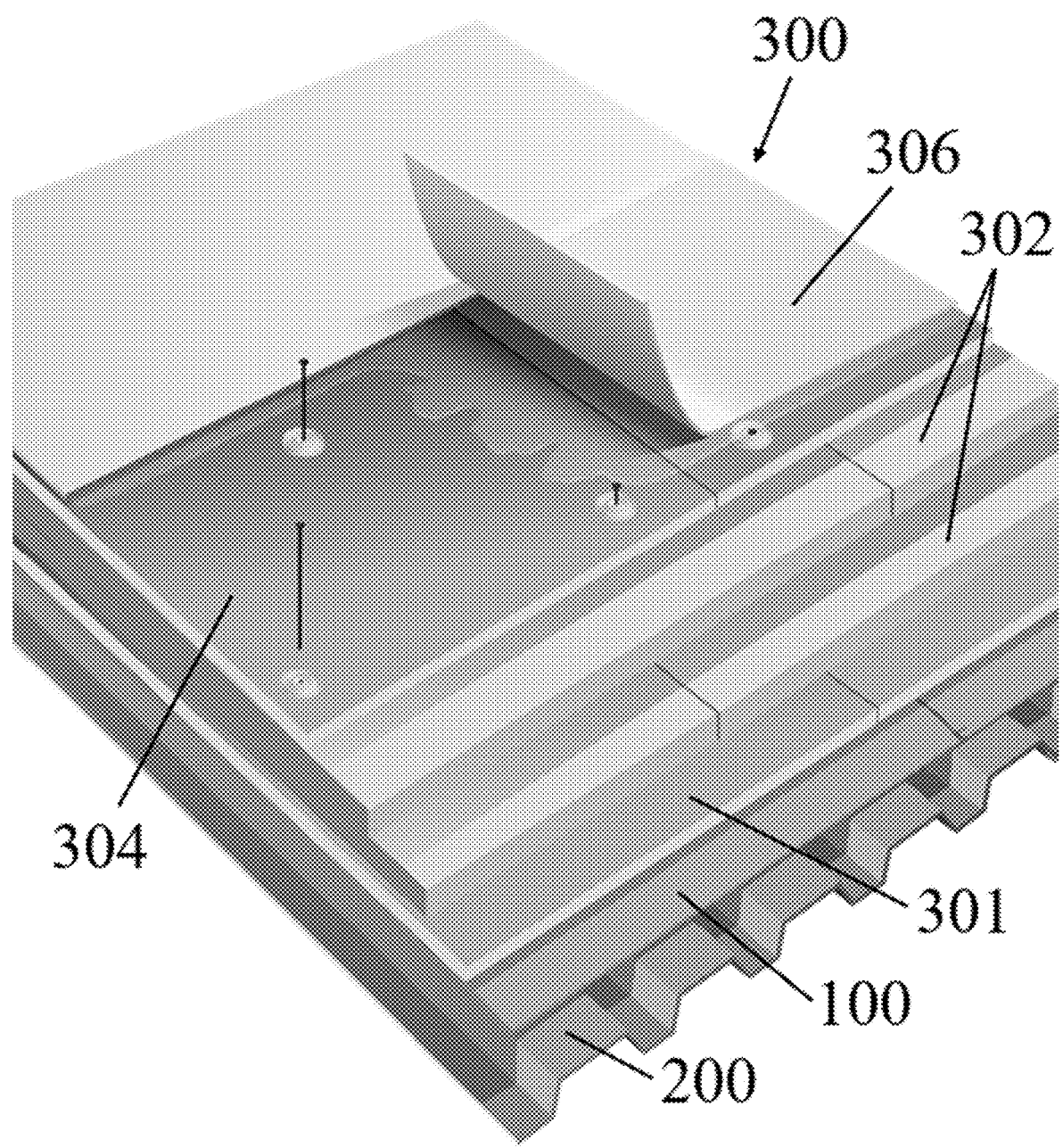

Turning to FIGS. 3-5, the exemplary building membrane 100 of FIGS. 1 and 2 is shown adhered to a building substrate 200. In the illustrated embodiment, the building substrate 200 is a corrugated roof deck, but it is appreciated that the building membrane 100 may be adhered to any building substrate 200 including, but not limited to, roof substrates such as corrugated metal roof decks, insulation, thermal barriers, gypsum boards, coverboards, plywood, OSB, I-Beams, gypsum decks, structural concrete, lightweight insulating concrete, metal components, wood decks, and formed decks. In embodiments, the building membrane 100 is at least partially translucent.

Turning to FIG. 4, an exemplary final roof assembly 300 is shown installed on a roof deck. The illustrated final roof assembly 300 comprises a roofing membrane 100, a thermal gypsum barrier board 301, an insulating layer 302, a gypsum cover board 304, and an FTR membrane 306. In embodiments, the building membrane 100 serves as a vapor barrier and the thermal gypsum barrier board 301, insulating layer 302, gypsum cover board 304, and FTR membrane 306 are positioned on top of the building membrane 100. It is appreciated that a final roof assembly 300 can contain any number or type of additional roofing elements, including, but not limited to insulation, a cover board, and additional membranes.

Referring again to FIG. 2, an exemplary method of roofing comprises the step of adhering a building membrane 100 to a building substrate 200. In the illustrated embodiment, the building substrate 200 comprises a roof deck. Turning to FIG. 3, said method of roofing further comprises the step of, after adhering the building membrane 100 to the building substrate 200, installing additional roofing elements on top of the building membrane 100 to form a final roof assembly 300 with enhanced durability and weatherability. In embodiments, the method of roofing further comprises the step of waiting 1 month-3 years after adhering the building membrane 100 to the building substrate 200 before installing the additional roofing elements on top of the building membrane 100.

Referring back to FIG. 2, in certain embodiments, the building membrane 100 comprises a generally planar core 102 having a top surface and a bottom surface, a polymeric back coat 106 positioned below the bottom surface of the core 102, a polymeric face coat 108 positioned above the top surface of the core 102, a polymeric top coat 110 positioned above the face coat 108, and a heat-activated adhesive base 112 on at least a portion of the back coat 106, and adhering the building membrane 100 to the building substrate 200 can comprise any of, directly or indirectly, ultrasonic welding, induction welding, hot gas welding, heat sealing, and transparent laser plastic welding. The step of adhering the building membrane 100 to the building substrate 200 can comprise, ultrasonically, inductively, convectively, or radiationally heating the heat-activated adhesive base 112 or ultrasonically, inductively, convectively, or radiationally heating the roofing substrate 200 or building membranes 100 thereby conductively heating the heat-activated adhesive base 122. In embodiments, heating the adhesive base 112 further comprises heating the adhesive base 112 to a bonding temperature of 250- to 500-degrees Fahrenheit.

Referring again to FIG. 3, the additional roofing elements can be adhered to the building membrane 100 and/or mechanically fastened directly to the building substrate 200. In embodiments, the roofing membrane 100 serves as a vapor barrier in the final roof assembly 300.

Referring to FIGS. 4-7, a final roof assembly 300 is illustrated where the building membrane 100 acts a vapor barrier in the final roof assembly 300. As can be seen in FIG. 4, the building membrane 100 is joined to the building substrate 200 in the manners and methods as described above. A thermal barrier 301, which is in adhesive, is attached, joined or affixed to the building membrane 100. The thermal barrier 301 can be a foam adhesive attached in ribbons or extruded to the building membrane and also can be a hot asphalt that is mopped or similarly applied to the building membrane 100. As can also be seen in FIG. 4, insulation layers 302 are provided. Depending on the application, either 1 or 2 insulation layers 302 are used. A coverboard 304 is also provided. The coverboard 304 is typically gypsum board or other similar such board-type materials. The coverboard 304 provides rigidity to the final roof assembly. A membrane 306 in adhesive is also provided.

As can be seen in FIG. 4, an adhered final roof assembly 300 is illustrated. In this embodiment the building membrane 100 is attached to the building substrate 200 as described above with the remaining elements thermal barrier 301, insulation layer 302, coverboard 304, and membrane 306 all adhered to each other to and to the building membrane 200 to yield an adhered final roof assembly. Similarly, FIG. 5 illustrates a partially adhered final roof assembly 300 where the thermal barrier 301 and insulation layer(s) 302 are loose laid, the coverboard 304 is mechanically attached to the combination of building membrane 100, thermal barrier 301 and insulation layer(s) 302 by means of suitable mechanically fastener such as bolts, screws or grommets. The membrane 306 is attached via adhesion.

Figure 6:
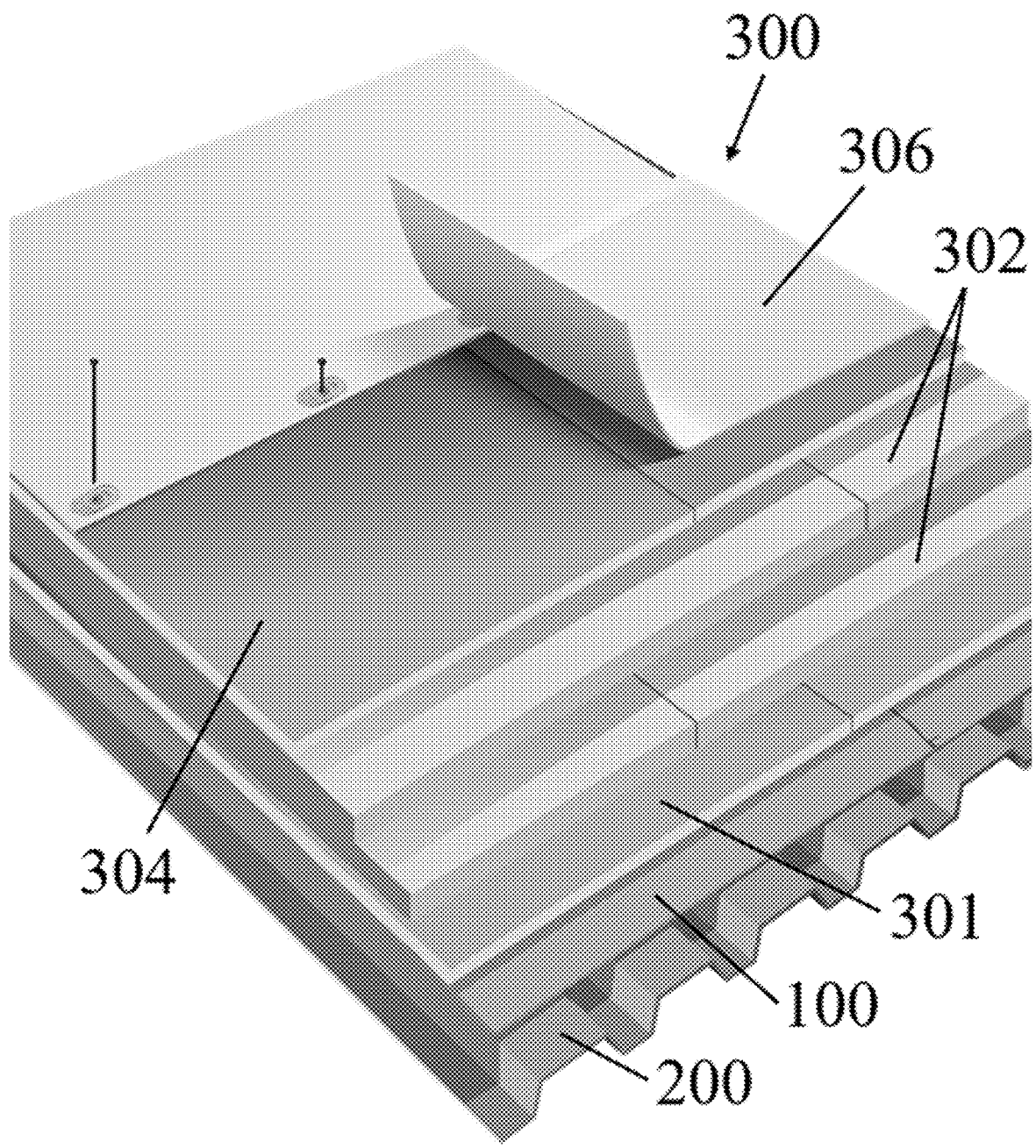

FIG. 6 illustrates a mechanically fastened final roof assembly 300 where the thermal barrier 301, insulation layer(s) 302 and coverboard are loose laid or preliminarily attached to each other and the building membrane 100 via glue. Mechanical fasteners 308 are then employed to attach/join/connect the membrane 306 to the other elements.

Figure 7:
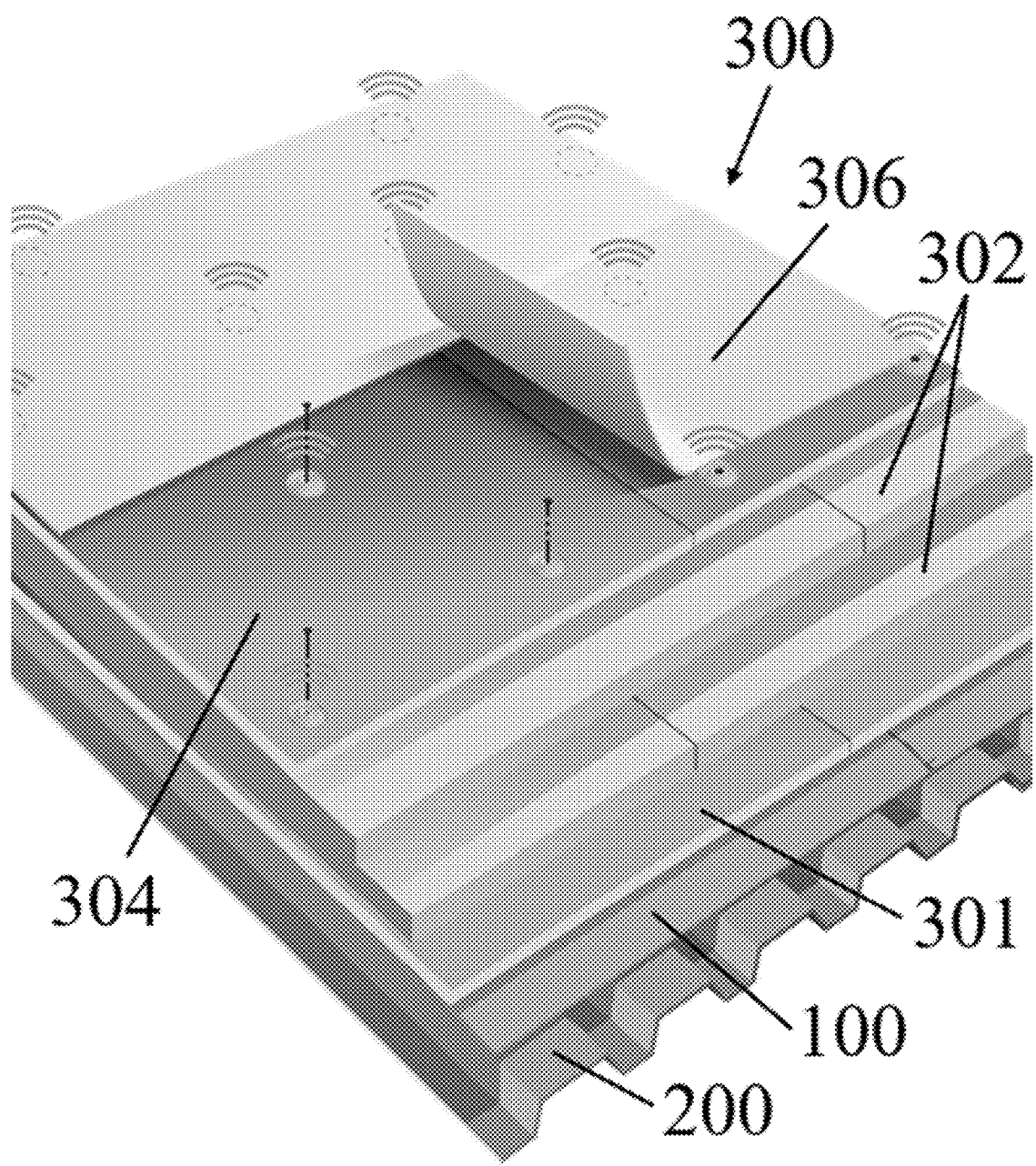

Finally, FIG. 7 illustrates a final roof assembly 300 where the thermal barrier 301 and insulation layer(s) 302 are loose laid and the coverboard 304 is mechanically fastened to these elements and the building membrane 100. Welding plates placed on the coverboard 304 and then using induction welding or other appropriate welding techniques as described above, the member 306 is joined to the coverboard.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the systems and methods described herein are not limited to the specific details, the representative embodiments, or the illustrative examples shown and described. Accordingly, departures may be made from such details without departing from the spirit or scope of the general aspects of the present disclosure.

What is claimed is:

1. A building membrane comprising:
   a generally planar core having a top surface and a bottom surface;
   a polymeric back coat positioned below the bottom surface of the core;
   a polymeric face coat positioned above the top surface of the core;
   an adhesive base on at least a portion of the back coat adapted for adhering the building membrane to a building substrate; and
   an adhesive coat planarly encompassing the core, at least partially encapsulating the core, at least partially penetrating the core, said adhesive coat adhering the back coat to the bottom surface of the core and the face coat to the top surface of the core.

2. The building membrane of claim 1 further comprising a polymeric top coat positioned above the face coat.

3. The building membrane of claim 1, wherein the core comprises a puncture, tensile, and tear-resistant woven or knit fabric.

4. The building membrane of claim 1, wherein the adhesive coat inhibits wicking.

5. The building membrane of claim 1, wherein the adhesive base comprises one or more portions of heat-activated adhesive adapted for adhering the building membrane to the building substrate.

6. The building membrane of claim 5, wherein the heat-activated adhesive bonds between 250- and 500-degrees Fahrenheit.

7. The building membrane of claim 5, wherein the heat-activated adhesive is thermoplastic or thermoset heat activating adhesive material.

8. The building membrane of claim 5, wherein the heat-activated adhesive is 0.1 to 1.0 mils thick.

9. The building membrane of claim 1, wherein at least one of the back and face coats comprises polyvinyl chloride.

10. The building membrane of claim 1, wherein the top coat comprises a vinyl-acrylic.

11. The building membrane of claim 1, wherein the top coat is 0.2 to 1.0 mils thick dry.

12. The building membrane of claim 1, wherein the building substrate is a metal roof deck.

13. The building membrane of claim 1, wherein the building substrate is insulation board.

14. The building membrane of claim 1, wherein the building substrate is a thermal barrier.

15. The building membrane of claim 1, wherein the building substrate is gypsum board.

16. The building membrane of claim 1, wherein the building substrate is wood board.

17. The building membrane of claim 1, wherein the building substrate is structural concrete roof deck.

18. The building membrane of claim 1, wherein the building membrane is a vapor permeable air barrier per 2018 IECC Section C402.5.1.2.1, ASHRAE Standard 90.1 and ASTM E2178 with no greater than 0.004 cfm/ft2 under a pressure differential of 0.3 inch water gauge (75 Pa).

19. The building membrane of claim 1 wherein the membrane has resistance to weathering is provided so that the membrane maintains performance as a vapor barrier and air barrier after weather exposure between 1 and 36 months.

20. A building membrane comprising:
    a generally planar core having a top surface and a bottom surface;
    a polymeric back coat positioned below the bottom surface of the core;
    a polymeric face coat positioned above the top surface of the core;
    an adhesive base on at least a portion of the back coat adapted for adhering the building membrane to a building substrate, wherein the building membrane is at least partially translucent.

21. A building membrane comprising:
    a generally planar fabric core having a top surface and a bottom surface;
    a polymeric back coat positioned below the bottom surface of the fabric core and adhered to the fabric core by an adhesive coat;
    a polymeric face coat positioned above the top surface of the fabric core and adhered to the fabric core by the adhesive coat;
    the adhesive coat planarly encompassing the core, at least partially encapsulating the core, and at least partially penetrating the core;
    a polymeric top coat positioned above the face coat; and
    a heat-activated adhesive base on at least a portion of the back coat and adapted for adhering the roofing membrane to a building substrate.

22. A method for creating a final roof assembly said method comprising adhering a building membrane to a roofing substrate and, without removing said membrane, affixing one or more additional roofing elements to the roofing substrate on top of the roofing membrane to form a final roof assembly, wherein the building membrane comprises:
    a generally planar core having a top surface and a bottom surface;
    a polymeric back coat positioned below the bottom surface of the core;
    a polymeric face coat positioned above the top surface of the core; and
    an adhesive base on at least a portion of the back coat opposite the core and adapted for adhering the building membrane to a roofing substrate.

23. The method of claim 22, wherein the adhesive coat comprises one or more sections of temperature-sensitive adhesive and the roofing substrate is a corrugated metal roof deck.

24. The method of claim 22, wherein the step of adhering the roofing membrane to the corrugated metal roof deck comprises one or more of ultrasonic welding, induction welding, hot gas welding, heat sealing, and transparent laser plastic welding.

25. The method of claim 22, wherein the step of affixing one or more additional roofing elements to the roofing substrate on top of the roofing membrane is performed at least some time after the step of adhering the roofing membrane to the roofing substrate is performed.

\* \* \* \* \*